United States Patent [19]

Gonzales et al.

[11] Patent Number: 5,488,688
[45] Date of Patent: Jan. 30, 1996

US005488688A

[54] DATA PROCESSOR WITH REAL-TIME DIAGNOSTIC CAPABILITY

[75] Inventors: David R. Gonzales; Gordon A. Carichner, both of Austin, Tex.

[73] Assignee: Motorola, Inc., Schaumburg, Ill.

[21] Appl. No.: 220,329

[22] Filed: Mar. 30, 1994

[51] Int. Cl.⁶ .................................................. G06F 11/34
[52] U.S. Cl. ............................................... 395/183.1
[58] Field of Search ...................... 395/575, 325, 395/183.10, 183.14, 183.15, 183.16; 371/16.1, 16.2, 15.1, 19

[56] References Cited

U.S. PATENT DOCUMENTS

| | | | |
|---|---|---|---|
| 4,674,089 | 6/1987 | Poret et al. | 371/25 |
| 4,813,009 | 3/1989 | Tallman | 364/900 |
| 4,881,228 | 11/1989 | Shouda | 371/19 |
| 4,924,382 | 5/1990 | Shouda | 364/200 |
| 5,047,926 | 9/1991 | Kuo et al. | 364/200 |
| 5,053,949 | 10/1991 | Allison et al. | 364/200 |
| 5,067,073 | 11/1991 | Andrews | 395/375 |
| 5,073,968 | 12/1991 | Morrison | 395/500 |
| 5,084,814 | 1/1992 | Vaglica et al. | 395/325 |
| 5,257,269 | 10/1993 | Hamauchi | 371/29.5 |
| 5,349,687 | 9/1994 | Ehlig et al. | 395/800 |
| 5,361,348 | 11/1994 | Nakamoto | 395/575 |

OTHER PUBLICATIONS

Sasaki et al.; "16 bit High–Speed DSP μPD77016;" NEC IC Microcomputer Sys., Ltd.; vol. 46, No. 2, pp. 75–78 (1993).
Steven H. Leibson; "In–Circuit emulators for μCs;" EDN; pp. 64–78 (1989).
Hunter Goatley; "The VMS Watchpoint Utility: Part I;" Perceptics Corp.; pp. 22–25 (1990).

*Primary Examiner*—Robert W. Beausoliel, Jr.
*Assistant Examiner*—Phung My Chung
*Attorney, Agent, or Firm*—Paul J. Polansky

[57] ABSTRACT

A data processor (20) includes a diagnostic circuit (23) with a first-in, first-out memory (FIFO) (25) for storing sequential states of an internal bus, such as a program address bus. In one mode, the diagnostic circuit (23) halts a central processing unit (CPU) (21) and the FIFO (25) on the occurrence of an event condition, such as a hardware breakpoint. In a second mode, the diagnostic circuit (23) halts the FIFO (25) but keeps the CPU (21) in normal operation. Thus, the contents of the FIFO (25) may be examined through a serial port while the CPU (21) is executing instructions normally.

11 Claims, 1 Drawing Sheet

DATA PROCESSOR WITH REAL-TIME DIAGNOSTIC CAPABILITY

FIELD OF THE INVENTION

This invention relates generally to data processors, and more particularly, to data processors with diagnostic capabilities.

BACKGROUND OF THE INVENTION

It is helpful for a data processor programmer to be able to observe the flow of software and its effect on internal registers, in order to diagnose and correct problems in the software. Traditionally, devices such as in-circuit emulators have been used. The in-circuit emulator has a pod which can be plugged in to a microprocessor socket. The in-circuit emulator acts like the microprocessor, but has the capability to perform single steps through the software and display the contents of the microprocessor's internal registers at each step. Older in-circuit emulators mimicked the performance of the microprocessor by using discrete circuitry whose operation duplicated that of the microprocessor, but which could be freely accessed in order to reveal the contents of the registers. In order to simplify in-circuit emulation, microprocessors started to be designed with features which would allow the microprocessor itself to be used in and to support emulation.

For example, the 68000 microprocessor available from Motorola, Inc. included a trace mode which single-stepped the microprocessor through the software, allowing the contents of internal registers to be viewed after each instruction. The 96002 digital signal processor (DSP), also available from Motorola, Inc., further enhanced emulation support by including an on-chip emulation circuit which allows for setting programmable breakpoints. These breakpoints would trigger on the occurrence of a particular program address.

Microprocessors themselves are also becoming more complex. Earlier microprocessors merely included a central processing unit (CPU), used a von Neumann architecture (contiguous program and data address spaces), and only had registers on-chip which were part of the programmer's model. More recently, microprocessors have included general purpose on-chip memory, both volatile and non-volatile. Recent microprocessors have also used a Harvard architecture (separate program and data address spaces), sometimes multiplexing accesses to each space. In addition, microprocessors have become more specialized. Commercially-available microprocessors now include conventional complex instruction set computer (CISC) microprocessors, reduced instruction set computer (RISC) microprocessors, microcomputer (embedded) processors, scalar processors, floating point processors, specialized coprocessors, and DSPs. The evolution of the microprocessor in these directions creates new difficulties for providing needed diagnostic capabilities.

The use of microprocessors in embedded control applications where information is processed in real-time, such as in a DSP, does not permit the microprocessor to be halted and interrogated as in other types of applications. Information on how or where a program is executing must be obtained in such a manner that the microprocessor cannot be interrupted. In the prior art of evaluating program flow, a microprocessor is either interrupted so that information is extracted, or the microprocessor is put in such a mode that the internal bus operation appears on the external bus at certain intervals. Such real-time applications include disk controllers and anti-lock brake systems, for example, where any interruption of the microprocessor's functions can cause the system to break or "crash".

This interruption is not allowable when a user tries to evaluate a program's flow for specific problems in low power applications where the external bus is either not accessible or is not to be activated. The use of external bus activity may cause simultaneous switching noise problems especially at low voltages. Also, stealing microprocessor clock cycles to extract this information may not be permissible in some applications. What is needed is a microprocessor which allows the user to evaluate program flow while the microprocessor runs in real-time, without sacrificing clock cycles.

SUMMARY OF THE INVENTION

Accordingly, the present invention provides, in one form, a data processor with real-time diagnostic capability, including a central processing unit (CPU), a first-in, first-out memory (FIFO), and a debug controller. The CPU is coupled to a bus, continuously executes instructions during a normal operation mode, and suspends instruction execution in response to a CPU halt signal. The FIFO is coupled to a portion of the bus, and sequentially stores states of the portion of the bus at corresponding locations of a plurality of locations when a FIFO halt signal is inactive. The debug controller activates both the CPU halt signal and the FIFO halt signal in response to a event condition in a first mode, and activates the FIFO halt signal but keeps the CPU halt signal inactive in response to the event condition in a second mode. The plurality of locations of the FIFO may thus be examined while the CPU is in the normal operation mode.

These and other features and advantages will be more clearly understood from the following detailed description taken in conjunction with the accompanying drawings.

DETAILED DESCRIPTION OF A PREFERRED EMBODIMENT

Figure 1:
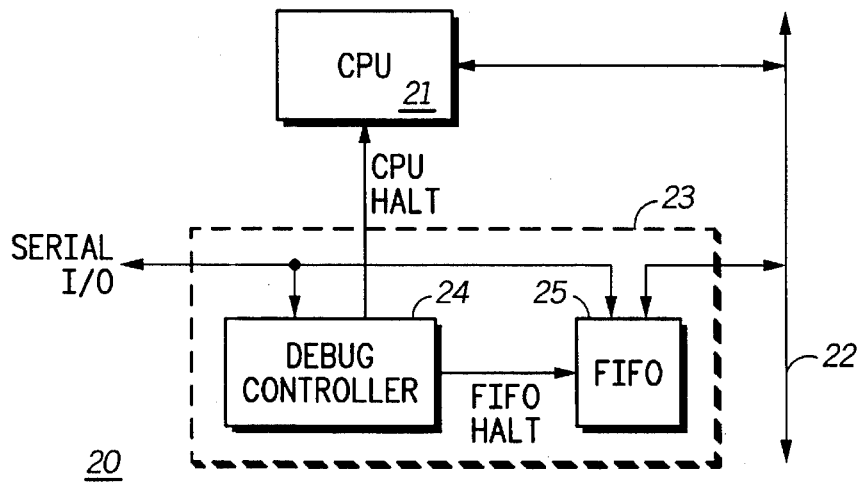
FIG. 1 illustrates in block diagram form a data processor with real-time diagnostic capability according to the present invention.

FIG. 1 illustrates in block diagram form a data processor 20 having real-time diagnostic capability according to the present invention. Data processor 20 includes generally a central processing unit (CPU) 21, a bus 22, and a diagnostic circuit 23. Data processor 20 is implemented as a single integrated circuit; other peripheral functions are implemented in data processor 20 but are omitted from FIG. 1. Bus 22 is a set of control, address, and data buses which are internal to data processor 20. CPU 21 is a specialized digital signal processor (DSP) having a Harvard architecture with separate program and data address spaces; thus, bus 22 represents multiple sets of control, address, and data buses. These sets are further specified in TABLE I below:

TABLE I

| BUS NAME | DESCRIPTION | CPU 21 SIGNAL DIRECTION |
| --- | --- | --- |
| XAB1 | X1 memory address bus | OUTPUT |
| CGDB | Core Global Data bus | INPUT/OUTPUT |

TABLE I-continued

| BUS NAME | DESCRIPTION | CPU 21 SIGNAL DIRECTION |
|---|---|---|
| XAB2 | X2 memory address bus | OUTPUT |
| XDB2 | X2 memory data bus | INPUT/OUTPUT |
| PAB | Program address bus | OUTPUT |
| PDB | Program data bus | INPUT/OUTPUT |
| PGDB | Peripheral global data bus | INPUT/OUTPUT |
| PIIB | Internal instruction bus | INPUT/OUTPUT |

Diagnostic circuit 23 is connected to bus 22, has a serial input/output connection labelled "SERIAL I/O", and provides a signal labelled "CPU HALT" to CPU 21. Internally, diagnostic circuit 23 includes two main functional blocks, a debug controller 24 and a first-in, first-out memory (FIFO) 25. Controller 24 has an input for receiving the SERIAL I/O which includes instructions to control the operation of controller 24, and an output for transmitting the SERIAL I/O data to an external computer. Controller 24 has an internal sequential state machine for controlling the operation of diagnostic circuit 23. Controller 24 has a first output for providing a signal to cause CPU 21 to go into a halt mode, labelled "CPU HALT", and a second output for providing a signal to cause FIFO 25 to halt its capture of data, labelled "FIFO HALT".

Data processor 20 has improved diagnostic capability over known data processors because diagnostic circuit 23 can selectively halt the CPU depending on whether its in one of two modes. In a first mode, known as normal diagnostic mode, diagnostic circuit 23 encounters an event condition and halts both CPU 21 and FIFO 25. Then a user can examine the contents of FIFO 25 to determine what flow of software instructions were executed prior to the event occurrence. In a second mode, known as the FIFO halt mode, diagnostic circuit 23 encounters an event condition and halts FIFO 25 but keeps signal CPU HALT inactive, so that CPU 21 continues to operate normally. A user can then examine the sequence stored in FIFO 25 while CPU 2I is running normally.

In the illustrated embodiment, FIFO 25 is connected to the PAB, and can determine the sequence of instruction addresses leading up to the event condition. Thus, the PAB appears to be the most useful bus to capture in FIFO 25. However, in other embodiments it may be desirable to store the history of another bus or perhaps several or all buses.

Any debugging feature that provides the user with more information without hindering execution is clearly advantageous. Data processor 20 simplifies debugging since the user doesn't have to halt and restart the application program. This advantage is more important when halting program execution causes hardware damage or when the process of restarting execution and repeating the problem is complex and tedious.

Data processor 20 accommodates several types of event conditions as well, which are listed in TABLE II below:

TABLE II

| EVENT CONDITION | DESCRIPTION |
|---|---|
| EXTERNAL REQUEST | Input signal indicates external event occurrence |
| HARDWARE BREAKPOINT | Breakpoint on occurrence(s) of specific data or address values as indicated by register |
| SOFTWARE BREAKPOINT | "DEBUG" or true "DEBUGcc" CPU instruction is executed |
| TRACE | Event occurs after executing a specified number of instructions |

In addition, FIFO 25 may be halted by setting a bit in a control register of debug controller 24. TABLE II does not list the setting of this control bit, since it is not an event condition per se. Note that different event conditions can activate both the CPU HALT and the FIFO HALT signals, as determined by various bits in the control register of controller 24. It is important to note that the actual event conditions supported will vary considerably from embodiment to embodiment.

Figure 2:
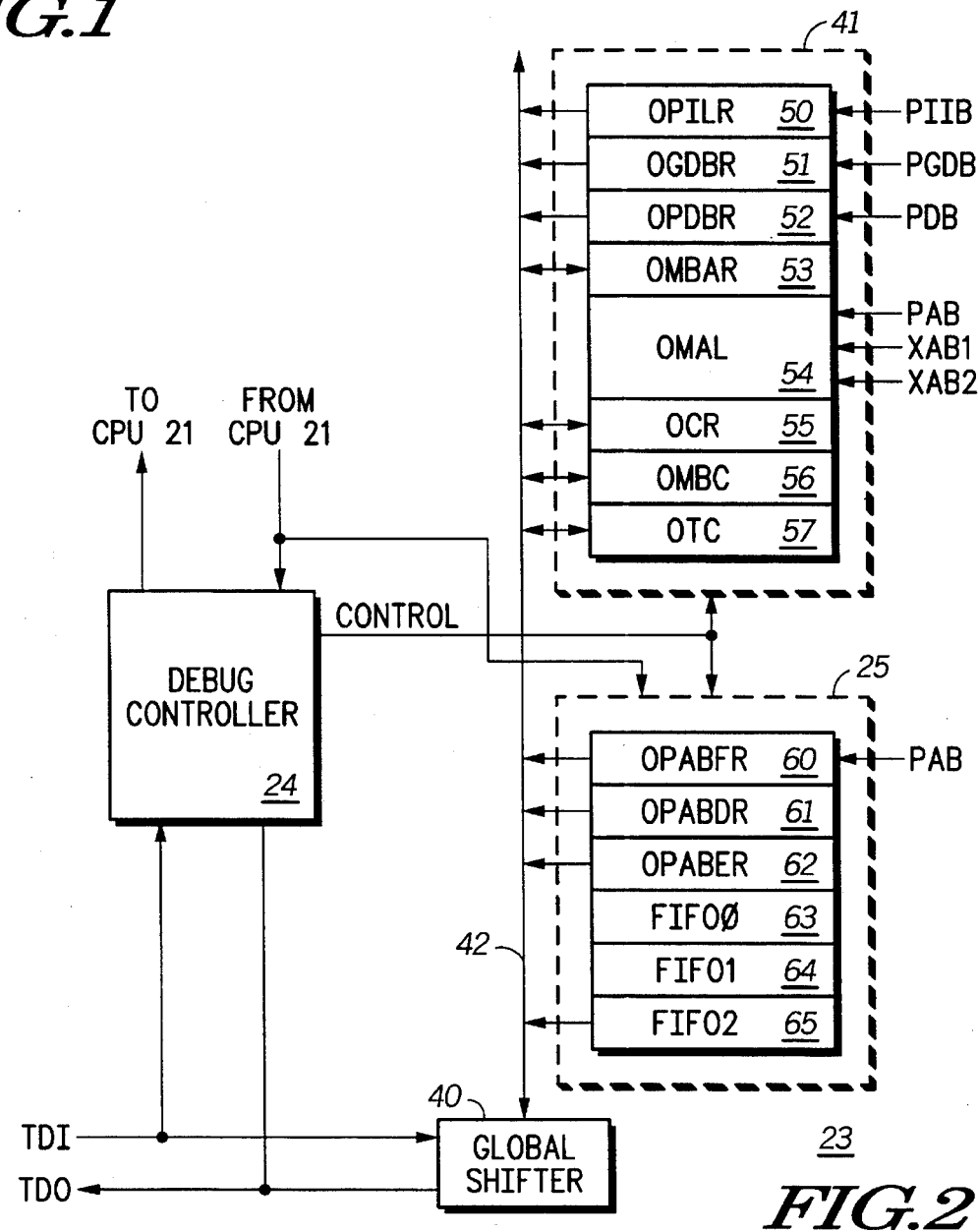
FIG. 2 illustrates in block diagram form the diagnostic circuit of FIG. 1.

FIG. 2 illustrates in block diagram form diagnostic circuit 23 of FIG. 1. Elements of FIG. 2 previously illustrated in FIG. 1 retain their prior reference numbers. Diagnostic circuit 23 includes, generally, debug controller 24, FIFO 25, a global shifter 40, and a register file 41. Global shifter 40 has a serial input for receiving a signal labelled "TDI", a serial output for providing a signal labelled "TDO", and a bidirectional connection to a 16-bit global shifter bus 42. Global shifter 40 conforms to the Test Data Register specifications described in the Institute of Electrical and Electronics Engineers (IEEE) Standard 1149.1, "Test Access Port and Boundary Scan Architecture", commonly known as the Joint Test Action Group (JTAG) standard. Thus, since data processor 20 already has a JTAG interface, no additional pins are required to interface diagnostic circuit 23 to external circuitry.

Debug controller 24 has a serial input terminal for receiving debug commands via signal TDI, a serial output terminal for providing debug data via signal TDO, a control input terminal connected to CPU 21, a control output terminal also connected to CPU 21, and a control output terminal connected to register file 41 and to FIFO 25. Register file 41 includes several registers for the control of diagnostic circuit 23, whose description is listed in TABLE III below:

TABLE III

| REGISTER | BUS CONNECTIONS(S) | DESCRIPTION |
| --- | --- | --- |
| OPILR 50 | PIIB (I) | Program instruction latch register, used in capturing pipeline information necessary for restarting CPU 21 |
| OGDBR 51 | PGDBB (I/O) | Global data transfer register, used to pass information from CPU 21 to debug controller 24 |
| OPDBR 52 | PDB (I/O) | Program data bus register, used to send opcodes and operands to CPU 21 from debug controller 24 |
| OMBAR 53 | None | Memory breakpoint address register, used for storing hardware breakpoint |
| OMAL 54 | PAB (I), XAB1(I), XAB2(I) | Latches of the 3 internal buses for comparison with OMBAR (hardware breakpoint) |
| OCR 55 | None | Debug controller control register |
| OMBC 56 | None | Memory breakpoint counter |
| OTC 57 | None | Instruction trace counter |

Diagnostic circuit 23 allows the user access to the internal state of CPU 21. The user can read/write any register or memory location by forcing instructions into the instruction stream of CPU 21. By setting up event conditions, the user can choose the exact point at which to query the internal state of CPU 21. The following describes how each register in the register file of diagnostic circuit 23 functions to support these capabilities.

Entry into the normal diagnostic mode of operation (CPU HALT signal active) causes the OPILR and the OPDBR to be loaded with the instruction that is currently in the decode stage of the CPU pipeline. The OPILR holds the opcode while the OPDBR holds the operand. These values are normally stored by the user in an external computer so that the current state of CPU 21 may be restored when returning to normal mode of operation (CPU HALT signal inactive).

Diagnostic circuit 23 can force CPU 21 to execute instructions by writing opcodes and operands to OPDBR. CPU 21 can read and write the OGDBR while diagnostic circuit 23 can only read the OGDBR. The OGDBR acts as a data transfer register from CPU 21 to diagnostic circuit 23. Internal CPU register and memory data can be written to OGDBR by a CPU instruction. The contents of the OGDBR can then be read out to signal TDO using diagnostic circuit 23.

Hardware breakpoint logic is accessed by writing the OMBAR, OMBC and OCR. A hardware breakpoint occurs when the value in OMBC is zero and the OMBC is decremented. The OMBC decrements when the value in OMBAR equals the value in OMAL. To set up a hardware breakpoint, the OMBAR is written with the address which the user wishes to cause an event on. The OMALR will latch PAB, XAB1 or XAB2 based on bit patterns (described below) in the OCR. The OMBC is written with the value equal to the number of times, minus 1, that the address is passed through.

The OTC works in a similar manner to the OMBC except that OTC decrements every time an instruction executes, regardless of what values are on any of the address buses. This action is called tracing and is enabled by setting a bit in the OCR. TABLE IV lists the control bits contained in the OCR. Detailed descriptions of how each control bit affects debug controller 23 are provided in the following paragraph.

TABLE IV

| OCR BIT NAME | NUMBER | DESCRIPTION |
| --- | --- | --- |
| * | 15–10 | Reserved |
| DRM | 9 | Debug request mask |
| FH | 8 | FIFO 25 halt |
| EM1 | 7 | Event modifier bit 1 |
| EM0 | 6 | Event modifier bit 0 |
| PWD | 5 | Power down |
| TME | 4 | Trace mode enable |
| BS1 | 3 | Breakpoint select bit 1 |
| BS0 | 2 | Breakpoint select bit 0 |
| BE1 | 1 | Breakpoint enable bit 1 |
| BE0 | 0 | Breakpoint enable bit 0 |

OCR bits 0 and 1 (BEx) are used to select one of three types of hardware breakpoint condition, that is, memory write, memory read, or memory access. OCR bits 2 and 3 (BSx) further define the hardware breakpoint condition, that is, program memory instruction fetch, program memory access, data memory (XAB1) access, or data memory (XAB2) access. OCR bit 4 (TME) is used to enable CPU instruction tracing. When this bit is set, the completion of a CPU instruction will decrement the OTC. OCR bit 5 (PWD) powers down the diagnostic circuit 23 to save power. OCR bits 6 and 7 (EMx) select the action to be taken on an event occurrence.

TABLE V lists the four encodings of bits EM1 and EM0 and their descriptions.

TABLE V

| FUNCTION | EM1 | EM0 | ACTION ON EVENT CONDITION |
| --- | --- | --- | --- |
| Normal | 0 | 0 | Halt CPU 21 and enter normal diagnostic mode |
| FIFO Halt | 0 | 1 | Halt OPABFR, OPABDR, OPABER, FIFO |

TABLE V-continued

| FUNCTION | EM1 | EM0 | ACTION ON EVENT CONDITION |
| --- | --- | --- | --- |
| | | | capture, but don't halt CPU 21 |
| Vector Enable | 1 | 0 | Enter CPU vector interrupt routine but don't halt CPU 21 |
| Re-arm | 1 | 1 | Toggle external pin but don't halt CPU 21 |

Note that EM bit encoding 00 is the only encoding that halts CPU 21. FIFO 25 is halted for encodings 00 and 01 only.

OCR bit 8 (FH) is used to halt FIFO 25. OCR bit 8 provides a simple mechanism of halting FIFO 25 without halting CPU 21 and without setting up event conditions. OCR bit 9 (DRM), when set, is used to mask external events.

FIFO 25 has six registers, including three registers storing addresses of instructions at three different stages of execution, plus three additional registers storing the three most recent program instruction addresses which cause a change of flow. These locations are described in TABLE VI below:

TABLE VI

| REGISTER | INPUT CONNECTION | DESCRIPTION |
| --- | --- | --- |
| OPABFR 60 | PAB (I) | Instruction fetch address register |
| OPABDR 61 | OPABFR 60 | Instruction decode address register |
| OPABER 62 | OPABDR 61 | Instruction execute address register |
| FIFO0 63 | OPABER 62/FIFO2 | First change-of-flow register |
| FIFO1 64 | FIFO0 63 | Second change-of-flow register |
| FIFO2 65 | FIFO1 64 | Third change-of-flow register |

OPABFR latches PAB when CPU 21 activates a corresponding control signal. CPU 21 activates this control signal only when the address on PAB is a program memory opcode fetch address (as opposed to program memory read/write addresses). OPABDR latches OPABFR when CPU 21 activates another corresponding control signal. CPU 21 activates this control signal when the opcode at the address that was last fetched enters the debug phase of instruction execution. OPABER latches OPABDR when CPU 21 activates yet another corresponding control signal. CPU 21 activates this control signal when the instruction at the address in OPABDR is executed.

FIFO0 latches OPABER when CPU 21 activates still another corresponding control signal. CPU 21 activates this control signal when the instruction at the address in OPABER caused a change of instruction flow (i.e. jumps, branches, and subroutine calls). This same signal from CPU 21 causes FIFO1 and FIFO2 to load such that the FIFOx registers maintain a history of the last x instructions that caused change of flow. This provides good information on program flow. The FIFOx registers can be extended beyond the case of (x=2) to provide even more information on program flow. When the user reads the FIFOx registers, the first value read is FIFO2. When this is done, FIFO0 latches FIFO2, FIFO1 latches FIFO0 and FIFO2 latches FIFO1. Therefore, after three consecutive FIFOx register reads, the FIFOx registers return to their state before the first read took place. The OPABFR, OPABDR, OPABER, and the FIFOx registers may be written only by CPU 21 and read only by diagnostic circuit 23.

By using an existing JTAG serial interface to communicate with diagnostic circuit 23, fewer integrated circuit pins are required than if a separate serial interface was used. Accessing diagnostic circuit 23 through the JTAG interface also makes multiple-CPU application debugging simpler since each diagnostic circuit (every CPU has a separate diagnostic circuit) can be attached in a serial chain such that only four JTAG pins need be controlled/observed to use any given number of diagnostic circuits.

The FIFO HALT mode is essential for communicating with CPU 21 while CPU 21 is executing time-critical code. Battery-operated applications such as cellular telephones, hand-held tracking devices, and computers require minimal power and noise to operate properly. Diagnostic checks of these devices is difficult, especially when they are designed in surface mount integrated circuit packaging technology.

The ability to diagnose a CPU's program flow using a serial interface such as JTAG coupled to a debug controller with breakpoint logic and a FIFO makes this job considerably easier. Special emulation connectors are not needed to control or communicate with CPU 21, logic analyzers are not needed to monitor the external bus activity, and CPU 21 does not have to be halted for interrogation for current program flow.

While the invention has been described in the context of a preferred embodiment, it will be apparent to those skilled in the art that the present invention may be modified in numerous ways and may assume many embodiments other than that specifically set out and described above. For example, program flow may be altered in real-time via an interrupt exception caused by a hardware breakpoint resulting from diagnostic information gathered using the FIFO HALT feature. This may be especially important for mask Read Only Memory (ROM) versions of a CPU which contain errors and need to have an alternate program flow path to correct the error. Statistical information gathering on a program's behavior can also be obtained using the re-arm feature of the OCR by providing a signal to an output pin on a breakpoint occurrence. Accordingly, it is intended by the appended claims to cover all modifications of the invention which fall within the true spirit and scope of the invention.

We claim:

1. A data processor with real-time diagnostic capability, comprising:

a central processing unit (CPU) coupled to a bus, for continuously executing instructions during a normal operation mode, and for suspending instruction execution in response to a CPU halt signal;

a first-in, first-out memory (FIFO) coupled to a portion of said bus, for sequentially storing states of said portion of said bus at corresponding locations of a plurality of locations when a FIFO halt signal is inactive; and a debug controller coupled to said CPU and to said FIFO, for activating both said CPU halt signal and said FIFO halt signal in response to an event condition in a first mode, and for activating said FIFO halt signal but keeping said CPU halt signal inactive in response to said event condition in a second mode, wherein said plurality of locations of said FIFO are observable while said CPU is in said normal operation mode.

2. The data processor of claim 1, wherein said event condition comprises one of a set consisting of: an activation of an external FIFO halt request, an external breakpoint request, a hardware breakpoint, a software breakpoint, and a trace occurrence.

3. The data processor of claim 1 further comprising a control register, coupled to said debug controller, for storing a plurality of mode control bits including at least one event modifier bit, said at least one event modifier bit determining whether said debug controller is in said first mode or said second mode.

4. The data processor of claim I further comprising a serial port coupled to said FIFO and to said debug controller having a serial input for receiving serial input data for selectable storage in either said FIFO or said debug controller, and a serial output for providing serial output data from a selectable one of either said FIFO or said debug controller.

5. The data processor of claim 1 wherein said CPU has a Harvard architecture (separate program and data spaces) and wherein said portion of said bus comprises a program address bus.

6. A data processor with real-time diagnostic capability, comprising:

a central processing unit (CPU) coupled to a bus, said CPU having a control input for receiving a CPU halt signal, said CPU continuously executing instructions during a normal operation mode, and for suspending instruction execution in response to said CPU halt signal;

a serial input/output port having a serial input terminal for receiving serial input data, and an output terminal for transmitting serial data;

a first-in, first-out memory (FIFO) coupled to a portion of said bus and to said output terminal of said serial input/output port, for sequentially storing states of said portion of said bus at corresponding locations of a plurality of locations when a FIFO halt signal is inactive; and a debug controller coupled to said output terminal of said serial input/output port, for activating both said CPU halt signal and said FIFO halt signal in response to an event condition in a first mode, and for activating said FIFO halt signal but keeping said CPU halt signal inactive in response to said event condition in a second mode, wherein said plurality of locations of said FIFO are observable while said CPU is in said normal operation mode.

7. The data processor of claim 6, wherein said event condition comprises one of a set consisting of: an activation of an external FIFO halt signal, an external breakpoint request, a hardware breakpoint, a software breakpoint, and a trace occurrence.

8. The data processor of claim 7 further comprising a control register, coupled to said debug controller, for storing a plurality of mode control bits including at least one event modifier bit, said at least one event modifier bit determining whether said debug controller is in said first mode or said second mode.

9. The data processor of claim 6 wherein said CPU has a Harvard architecture (separate program and data spaces) and wherein said portion of said bus comprises a program address bus.

10. A diagnostic circuit, comprising:

a serial input port having a serial input terminal for receiving serial input data, and an output terminal;

a first-in, first-out memory (FIFO) coupled to a portion of a bus and to said output terminal of said serial input port, for sequentially storing states of said portion of said bus at corresponding locations of a plurality of locations when a FIFO halt signal is inactive;

a debug controller coupled to said output terminal of said serial input/output port, for activating both a CPU halt signal and said FIFO halt signal in response to an event condition in a first mode, and for activating said FIFO halt signal but keeping said CPU halt signal inactive in response to said event condition in a second mode; and a control register, coupled to said debug controller, for storing a plurality of control bits including at least one event modifier bit, said at least one event modifier bit determining whether said debug controller is in said first mode or said second mode, wherein said plurality of locations of said FIFO are observable in said second mode.

11. The data processor of claim 10, wherein said event condition comprises one of a set consisting of: an activation of an external FIFO halt signal, an external breakpoint request, a hardware breakpoint, a software breakpoint, and a trace occurrence.

* * * * *